US 6,341,195 B1

United States Patent
Mankovitz et al.

(12) United States Patent
(10) Patent No.: US 6,341,195 B1
(45) Date of Patent: *Jan. 22, 2002

(54) APPARATUS AND METHODS FOR A TELEVISION ON-SCREEN GUIDE

(75) Inventors: Roy J. Mankovitz, Encino; Henry C. Yuen, Redondo Beach, both of CA (US)

(73) Assignee: E-Guide, Inc., Beverly Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/862,199

(22) Filed: May 23, 1997

Related U.S. Application Data

(63) Continuation-in-part of application No. 08/368,340, filed on Dec. 30, 1994, now Pat. No. 5,659,367, which is a continuation-in-part of application No. 08/364,708, filed on Dec. 28, 1994, now Pat. No. 5,640,484.

(51) Int. Cl.⁷ ............................ H04N 5/76; H04N 5/445
(52) U.S. Cl. ...................... 386/83; 348/468; 348/906; 725/39
(58) Field of Search ................ 386/1, 83; 348/468, 348/461, 906; 725/39–56; H04N 5/76, 5/92, 5/445

(56) References Cited

U.S. PATENT DOCUMENTS

| 4,025,851 A | 5/1977 | Hasselwood et al. ......... 325/31 |
| 4,316,217 A | 2/1982 | Rifken ......................... 358/86 |
| 4,361,848 A | * 11/1982 | Poignet et al. ................. 358/1 |
| 4,477,840 A | 10/1984 | Kluth ......................... 358/330 |
| 4,605,958 A | * 8/1986 | Machnik et al. ................ 348/1 |
| 4,633,462 A | * 12/1986 | Stifle et al. .................... 370/85 |
| 4,641,205 A | 2/1987 | Beyers, Jr. ................. 360/33.1 |
| 4,706,121 A | * 11/1987 | Young ........................ 358/142 |

(List continued on next page.)

FOREIGN PATENT DOCUMENTS

| EP | 0208931 | 1/1987 | .......... H04N/5/782 |
| EP | 0393955 | 10/1990 | .......... G11B/27/34 |

*Primary Examiner*—Thai Tran
(74) *Attorney, Agent, or Firm*—Christie, Parker & Hale, LLP

(57) ABSTRACT

Apparatus and methods are provided for a television guide. In one embodiment the apparatus includes a device for comparing a current time with at least one stored time period for extracting television guide data to determine if the current time is within the stored time period, a device for switching a signal output from a first television signal source to a second television signal source, if television guide data is not contained in the signal output from the first television signal source when the current time is within the stored time period, a device for extracting the television guide data from the signal output when the current time is within the stored time period, and a memory for storing the extracted television guide data. In another embodiment the apparatus includes a device for controlling a tuner to tune to a plurality of channels in the first television signal source, when the current time is within the stored time period, a device for controlling a tuner to tune to a plurality of channels in the second television signal source, when the current time is within the stored time period, and a device for locking the tuner on a channel containing television guide data in order to permit extraction of the television guide data from the channel, wherein the device for switching switches from the first television signal source to the second television signal source, if television guide data is not contained in the signal output from the plurality of channels in the first television signal source.

14 Claims, 6 Drawing Sheets

U.S. PATENT DOCUMENTS

| | | | |
|---|---|---|---|
| 4,866,434 A | | 9/1989 | Keenan ................. 340/825.72 |
| 4,894,714 A | * | 1/1990 | Christis ........................ 348/10 |
| 4,908,707 A | * | 3/1990 | Kinghorn ................... 358/147 |
| 4,908,713 A | | 3/1990 | Levine ....................... 358/335 |
| 4,977,455 A | * | 12/1990 | Young ........................ 358/142 |
| 5,008,750 A | * | 4/1991 | Gomikawa ................. 348/468 |
| 5,121,476 A | * | 6/1992 | Yee ............................ 395/154 |
| 5,144,438 A | * | 9/1992 | Kim ........................... 348/565 |
| 5,251,035 A | | 10/1993 | Kurita et al. ............... 358/188 |
| 5,253,120 A | | 10/1993 | Endoh ....................... 360/19.1 |
| 5,296,932 A | | 3/1994 | Long .......................... 348/731 |
| 5,299,011 A | * | 3/1994 | Choi ....................... 455/186.1 |
| 5,307,173 A | * | 4/1994 | Yuen et al. .............. 455/186.1 |
| 5,329,500 A | * | 7/1994 | Baik et al. .................... 368/10 |
| 5,335,079 A | | 8/1994 | Yuen et al. ................. 358/335 |
| 5,335,277 A | | 8/1994 | Harvey et al. ................ 380/20 |
| 5,343,251 A | * | 8/1994 | Nafeh ........................ 348/571 |
| 5,374,961 A | | 12/1994 | Jung .......................... 348/468 |
| 5,390,027 A | * | 2/1995 | Henmi et al. ................ 358/335 |
| 5,408,692 A | * | 4/1995 | Suzuli et al. ............. 455/186.1 |
| 5,432,558 A | * | 7/1995 | Kim ........................... 348/460 |
| 5,436,676 A | * | 7/1995 | Pint et al. ................... 348/906 |
| 5,465,385 A | * | 11/1995 | Ohga et al. ................. 455/3.1 |
| 5,499,103 A | | 3/1996 | Mankovitz ................... 386/96 |
| 5,508,815 A | | 4/1996 | Levine ....................... 358/335 |
| 5,515,173 A | * | 5/1996 | Mankovitz et al. ......... 386/131 |
| 5,532,732 A | | 7/1996 | Yuen et al. ................. 358/335 |
| 5,541,738 A | * | 7/1996 | Mankovitz ................... 386/83 |
| 5,543,929 A | * | 8/1996 | Mankovitz et al. ........... 386/46 |
| 5,546,193 A | * | 8/1996 | Hailey et al. ............ 455/186.1 |
| 5,574,965 A | * | 11/1996 | Welmer ...................... 455/3.2 |
| 5,640,484 A | * | 6/1997 | Mankovitz ................... 386/83 |
| 5,684,525 A | * | 11/1997 | Klosterman ................ 348/906 |
| 5,982,411 A | * | 11/1999 | Eyer et al. .................. 348/906 |
| 6,011,594 A | * | 4/2000 | Takashima .................. 348/468 |

* cited by examiner

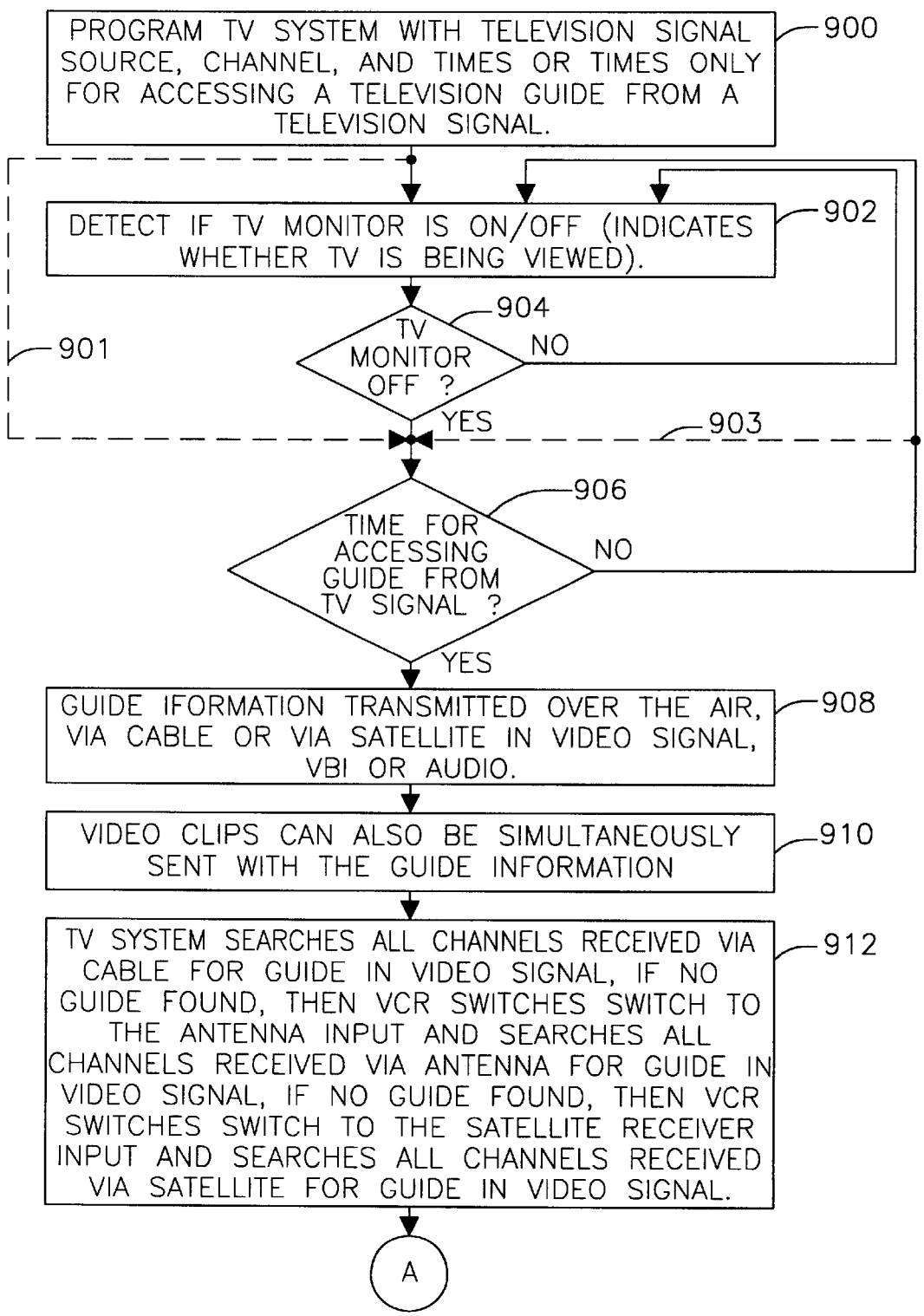

APPARATUS AND METHODS FOR A TELEVISION ON-SCREEN GUIDE

CROSS-REFERENCE TO RELATED APPLICATIONS

This is a continuation-in-part of patent application Ser. No. 08/368,340, filed Dec. 30, 1994 now U.S. Pat. No. 5,659,367, which is a continuation-in-part of patent application Ser. No. 08/364,708 filed Dec. 28, 1994 now U.S. Pat. No. 5,640,484. The subject matter of all of the above referenced patent applications, continuation and continuation-in-part applications are incorporated herein by this reference, as though set forth in full.

BACKGROUND OF THE INVENTION

This invention relates generally to electronic guides and particularly to television guides, such as television program schedule guides. This invention also relates to detecting and selectively retrieving a television guide from a number of television signal sources.

Program guides that can be used to select programs for viewing or recording are commonly available in newspapers. An on-screen television guide is desirable so that a viewer can access the guide directly without consulting another media. It is desirable that apparatus and methods be provided to ensure that guide data for an on-screen television guide is always available.

On-screen television guides for VCRs are available in which television guide information is embedded in a television signal at the signal source and extracted at the viewer site. The signal source may be a cable head end, over-the-air broadcasting stations or satellite stations. This multiplicity of potential guide sources complicates the viewer's ability to receive and access the desired on-screen television guide.

SUMMARY OF THE INVENTION

According to the present invention, apparatus and methods are provided for a television guide. In one embodiment the apparatus includes a device for comparing a current time with at least one stored time period to determine if the current time is within the stored time period, a device for switching a signal output from a first television signal source to a second television signal source, if guide information is not contained in the signal output from the first television signal source when the current time is within the stored time period, a device for extracting the guide information from the signal output when the current time is within the stored time period, and a memory for storing the extracted guide information.

In another embodiment the apparatus includes a device for controlling a tuner to tune to a plurality of channels in the first television signal source, when the current time is within the stored time period, a device for controlling a tuner to tune to a plurality of channels in the second television signal source, when the current timer is within the stored time period, and a device for locking the tuner on a channel containing guide information in order to permit extraction of the guide information from the channel, wherein the device for switching switches from the first television signal source to the second television signal source, if guide information is not contained in the signal output from the plurality of channels in the first television signal source.

In yet another embodiment of the invention, the apparatus searches for guides from all sources of television signals, identifies the guides and allows the viewer to select the desired guide. The channel and transmission time for the viewer selected guide information is then stored in a memory for future data reception.

Other objects and many of the attendant features of this invention will be more readily appreciated as the same becomes better understood by reference to the following detailed descriptions and considered in connection with the accompanying drawings in which like reference symbols designate like parts throughout the figures.

DESCRIPTION OF THE DRAWINGS

FIGS. 5A and 5B are flow diagrams of a method for searching television signal sources and channels in order to extract a television guide from a television signal according to the present invention.

DETAILED DESCRIPTION OF THE INVENTION

Figure 1:
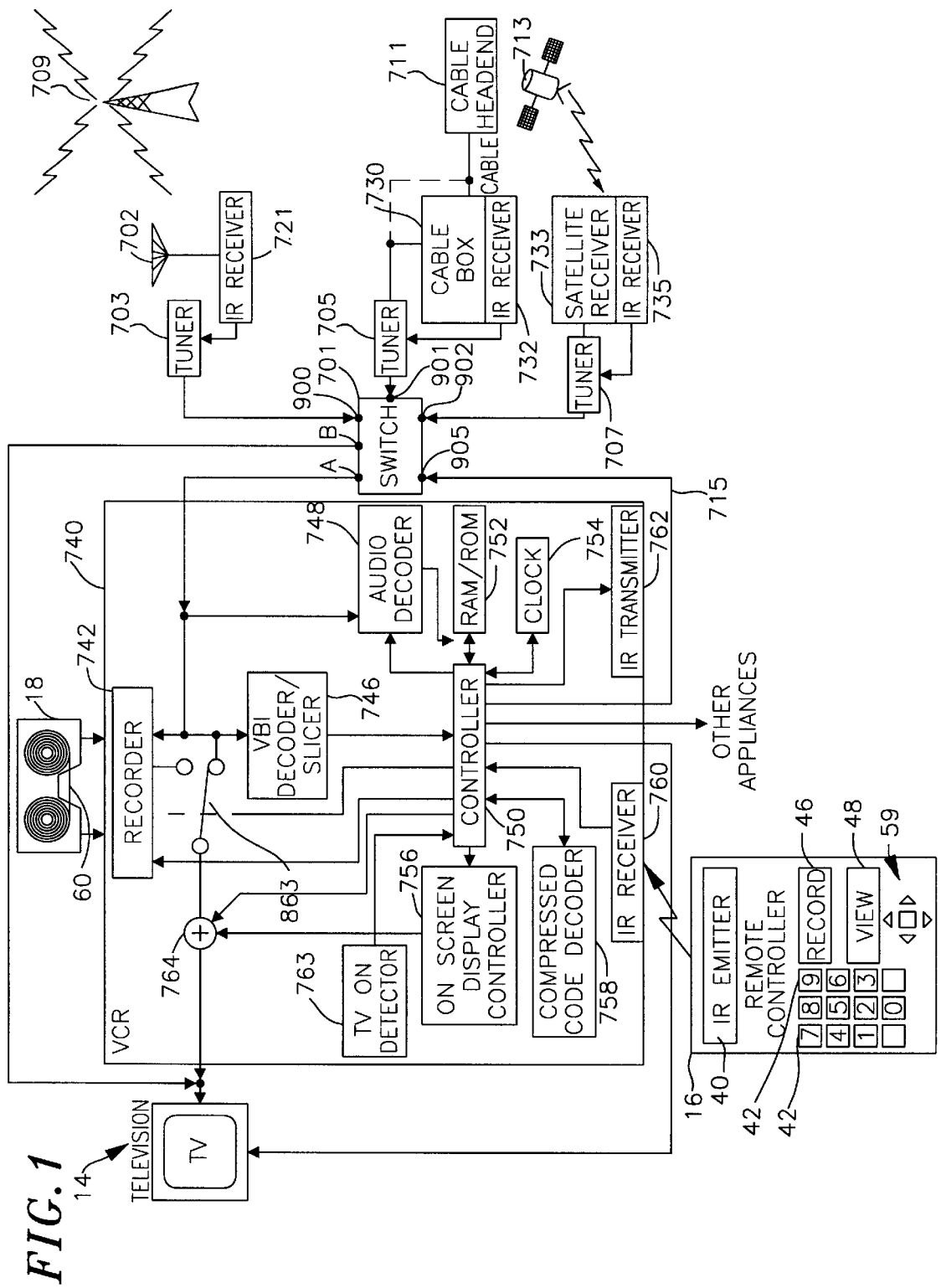
FIG. 1 is a schematic showing apparatus for a VCR according to the present invention.

FIG. 1 illustrates a presently preferred embodiment of a VCR 740 including a controller 750 which receives data from, and/or controls all elements of the VCR 740 including: an infrared (IR) receiver 760, an IR transmitter 762; a clock 754; RAM/ROM memory 752; an audio decoder 748; a VBI decoder/slicer 746; a display signal switch 863; a recorder 742; a video signal adder/switch 764; a TV "on" detector 763; an on-screen display controller 756; and a compressed code decoder 758. A number of these components could alternatively be incorporated into a television 14.

The IR receiver 760 receives command signals from a viewer operated remote controller 16. The IR transmitter 762 communicates command signals from the controller 750 to other appliances, including the television signal source receivers: including but not limited to an antenna 702; a cable box 730; and a satellite receiver 733. The controller 750 uses the clock when executing time dependent operations and periodically updates the clock using information embedded in a television signal. The controller stores and retrieves data in the memory 756, including guide information, guide formatting data, and IR codes for communicating with the remote controller 16. The other components of the VCR in conjunction with their function are explained in greater detail below.

The controller 750 communicates with the IR detector 735 for the satellite receiver 735 and the IR detector 732 for the cable box via IR transmitter 762. The controller 750 communicates with television antenna 702 by IR transmitter 762 via IR receiver 72, or if the controller 750 and tuner are incorporated in the television, by direct wiring. The controller also communicates with the television 14, either by IR or direct wiring.

The television 14 is assumed to have a mute control feature for turning off the sound of the television upon command. The VCR 740 is assumed to have the following features: play, rewind, record, stop, index, index mark, and still frame.

As shown in FIG. 1, the television signal sources include an over-the-air broadcast station 709, cable television head end 711 or satellite station 713, which are received by the VCR via the antenna 702, cable box 730, and satellite receiver 733, respectively. Preferably, the antenna 702, cable box 730, and satellite receiver 733 each include a tuner 703, 705, 707, respectively, and an IR receiver 721, 732, 735, respectively. Each tuner is connected to a tuner switch 701. The tuner switch 701 has an antenna input 900, a cable box input side 901 and a satellite receiver input 902, and can switch the signal received at any one of these input sites to either an output side A connected to the VCR 740 or an output B connected directly to the television 14. Output B may be switched off so that no television signal is output from this site. The tuner switch is controlled by the controller 750 which controls the tuner switch 701 to route the signals from each input 901, 902, 903 to either output A or output B.

Viewer operated remote controller 16 communicates with controller 750 and has number keys 42, an initialization key 44, a record key 46, a view key 48, and a cursor controller 59, the operation of which are explained further below. The remote controller 16 has an IR emitter 40 that can communicate with IR receiver 760 in the VCR 740.

According to a presently preferred embodiment of the invention, the VCR determines on which of a number of sources of television signals a desired guide information is being broadcast and stores that information for subsequent display on television 14.

In one embodiment, the guide information is embedded in the vertical blanking interval (VBI) of the television signal. The VBI is used to carry several different types of information, such as closed captioning text and teletext information. According to one embodiment of the invention, guide information is inserted in the VBI as discrete data packets. Preferably, all guide information data packets include one or more bits which act as identifying markers identifying the type of guide information in the data packet, e.g., a television program guide, video clip, or the guide provider. Guide information in the VBI is detected by the VBI decoder/slicer 746 which extracts the guide information from the signal and decodes it into a form usable by the VCR. The controller then stores this information in the memory 752.

In another embodiment of the invention, the entire guide is transmitted as tones encoded in the audio portion of the television signal. One reason to transmit the guide in the audio is that, unlike information in the VBI, the audio will not be stripped by a cable company from the television signal. There are several ways to avoid annoying the listener when the tones are played during decoding of the guide information in the audio signal. First, it is assumed that the guide is transmitted during the night when channel rates are lower and the viewer's television is OFF—hence the audio tones will not be heard. If a start message audio tone, which indicates the beginning of the guide, is detected by the audio decoder 748, then the controller 750 will send a signal to the a television 14 to mute the audio signal coming from the audio head. This effectively blocks any audio output from the VCR 740 to the television 14. An end of message audio tone at the end of the guide restores the audio.

According to one embodiment, the viewer programs the VCR 740 to receive the desired guide information using information supplied by the guide supplier. The guide information may include program guide and/or video clip information. The reception and display of video clips by a VCR including a VCR is more specifically described in U.S. patent application Ser. No. 08/368,340 which has been incorporated above. Basically, video clip information containing video images is embedded in a television signal which can be extracted and decoded by the VCR and recorded by a VCR on a video tape for display as moving video images. The video clips can be previews of selected programs or advertisements. The video clips are indexed on the tape so that the television can automatically cue the tape to the beginning of the recorded video clip when the viewer selects to view that video clip. One method for selecting a video clip is by selecting a program listing from an on-screen guide for a program to which that video clip corresponds.

The program guide may be transmitted in the same portion of the television signal as the program guide information (i.e., VBI or audio) or separately in the other portion. Using the remote controller 16, the viewer programs the controller to tune a designated television signal source receiver, e.g., antenna 702, cable box 730 or satellite receiver 733, to a designated channel at a designated time for reception of the guide information. The controller 750 controls the tuner switch 701 to route the designated television signal source to the VBI decoder/slicer 746 and/or the audio decoder 748 during this reception period. The guide is transmitted on a particular channel generally at night for a duration of 0.5 to two hours.

Figure 2:
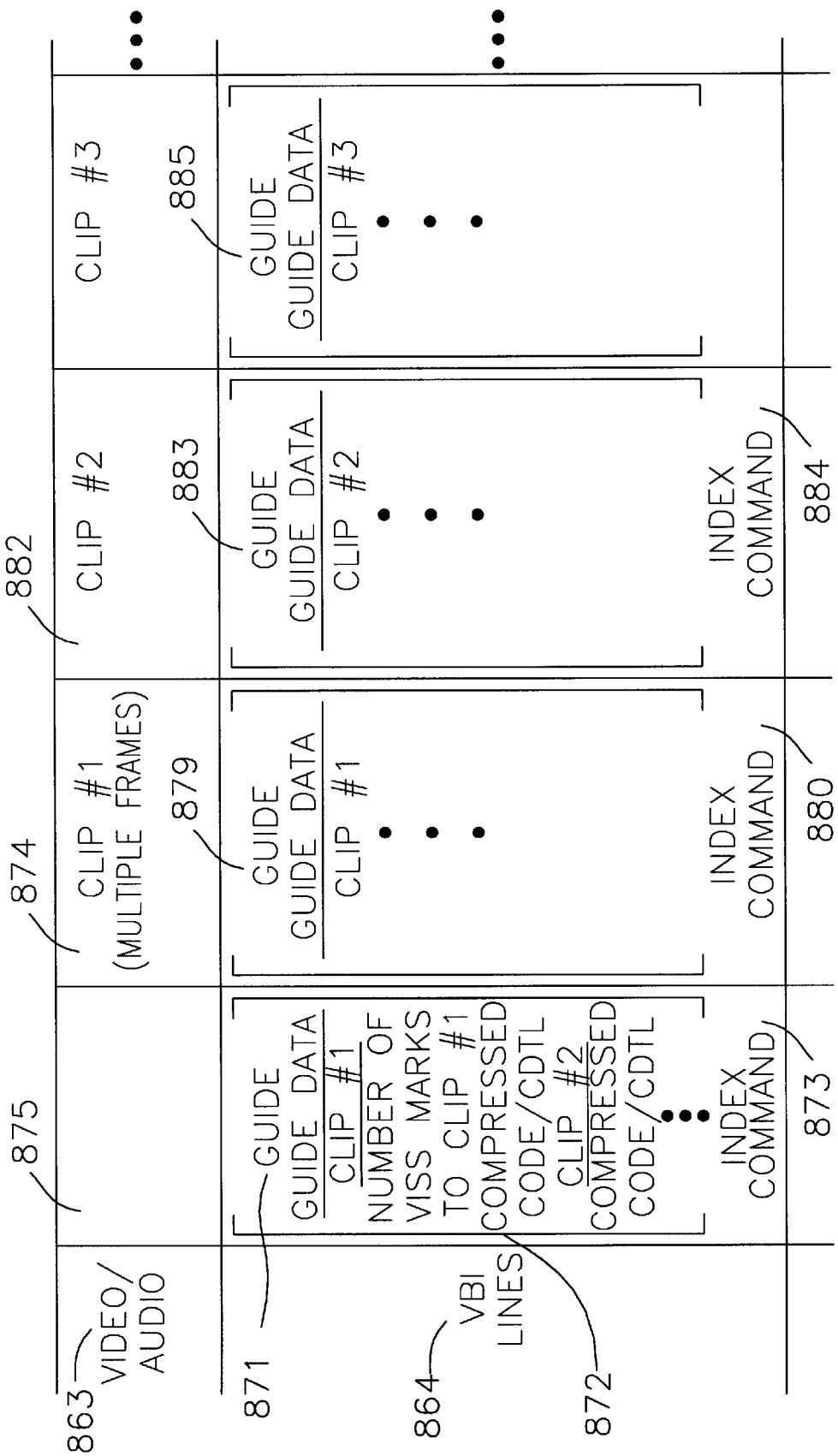
FIG. 2 is a timing diagram showing video clips and audio transmitted along with guide data in the vertical blanking interval lines according to the present invention.

FIG. 2 illustrates one of many possible formats for sending guide information embedded in a television signal. The television signal into which the guide data is embedded can be from any of the television signal sources and on any of the channels of any of the television signal sources. As shown in FIG. 2, the video/audio 863 can contain video clips such as clip 874 and clip 882. The VBI lines 864 which are embedded in the video signal can contain guide information. The guide information can be transmitted in the VBI lines as shown by guide 871 and overlapped with a blank video/audio portion as shown by element 875. Alternatively, the guide data can be embedded in video clips as shown by the overlap of timing between guide 879 and clip 874 and guide 883 and clip 882. The guide can contain a complete listing of television programs on all available channels for a period of time in the future, for example for the next week. The guide data can also include information for accessing the clips that are transmitted along with the guide. For example, the number of VISS marks to each clip can be listed as shown by element 872 as well as compressed codes or CDTL information, which can be used to program a recorder for recording a program associated with the clip. For example, the clip can be a preview of a program to be transmitted at a later date and the compressed code or CDTL information allows the viewer to program a recorder to automatically record the program at a later time. As shown, index commands can also be embedded in the VBI lines as indicated by index commands 873, 880, and 884. When the television signal containing the clips and the guide and guide data are received, the television signal can be recorded by a VCR and while this recording occurs the index commands can be used to write VISS marks into a control track on the video tape. The VISS marks recorded in the control track can be used along with the guide data to enable the viewer to conveniently access the clips recorded by the VCR for viewing.

Figure 3:
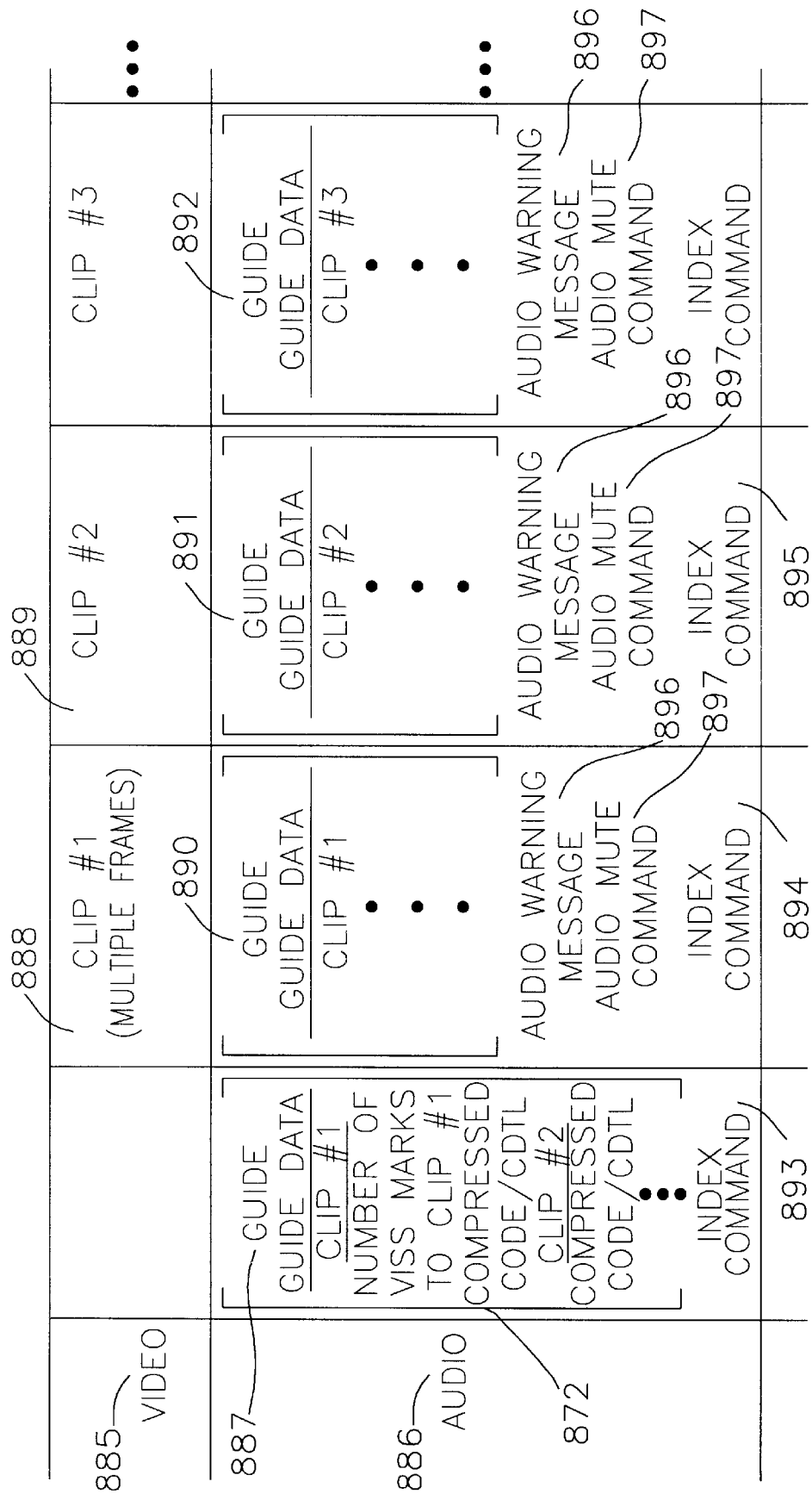
FIG. 3 is a timing diagram showing video clips transmitted along with guide data in the audio according to the present invention.
Figure 4:
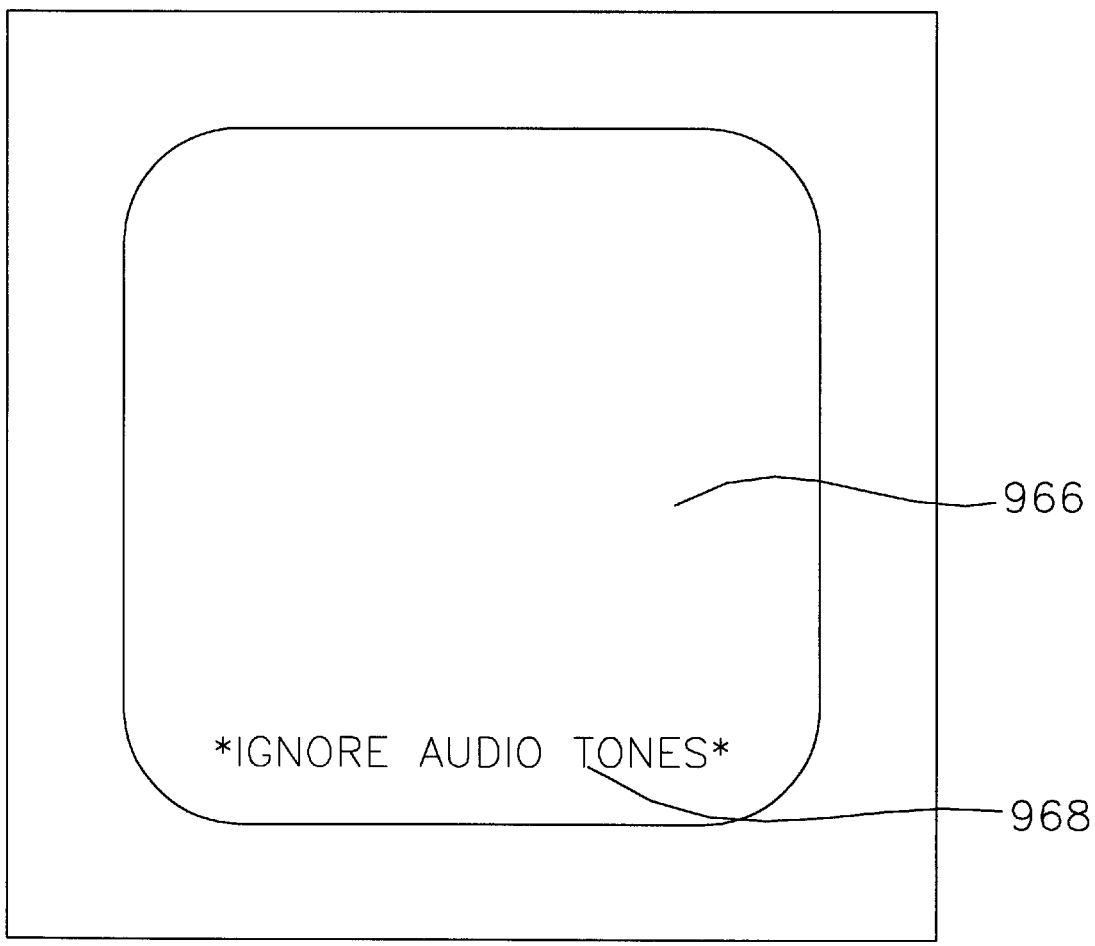
FIG. 4 is an illustration of a television monitor displaying a message to a viewer to ignore the audio tones when guide data is contained in the audio, according to the present invention.

FIG. 3 illustrates another format for receiving guide and guide data in a television signal from any of the television signal sources and from any channel of the television signal sources. As shown, the guide and guide data is contained in the audio 886 of the television signal. In this case the vertical blanking interval lines are not used for transmitting guide or guide data. The video portion 885 of the television signal can be used to transmit video clips such as clips 888 and 889. The guide and guide data are transmitted as audio tones in the audio as illustrated by guides 887, 890, 891, and 892. The index commands 893, 894 and 895 are used in the same manner as the index commands shown in FIG. 2, for writing VISS marks onto the control track of a tape if the video clips are recorded by VCR to allow later access of the video clips. Because the video clips have no audio and because the guide is transmitted in the audio during the time that the clips are received in the video signal, an audio warning message 896 is encoded in the audio and is decoded and displayed during viewing of a recorded video clip so that the viewer can ignore the audio tones caused by the encoded guide and guide data. Alternatively, the audio warning message can be embedded in the video of each of the video clip frames so that the viewer sees a message such as that shown in FIG. 4 which shows a message "ignore audio tones" 968 at the bottom of the television screen 966. In another embodiment an audio mute command 897 can be embedded in the audio tones and can be decoded to command the television to mute the audio during the viewing of the video clips. When the television signal as shown in FIG. 3 is recorded by the VCR, the video clips can be accessed in a manner similar to that of the format shown in FIG. 2, except that the data in the audio tones are decoded instead of decoding data in the vertical blanking interval.

One scenario for sending guide information along with video clips is to transmit the television guide and guide data during the middle of the night when the television is likely to be turned off. The controller 750 can be preprogrammed to search for the transmitted television guide during particular time periods in the night. For example, the television guide might be transmitted from 2:00 A.M. to 2:30 A.M. and then transmitted again between the times of 4:00 A.M. and 4:30 A.M. The transmission of the guide data can be repeated during the night and even during the day. The controller 750 would compare the time on clock 754 to the preprogrammed times to determine a time at which to begin a search for the television guide and guide data. However, if the television is ON, then it is desirable that the controller 750 delay the search until the next time that the television guide is transmitted. During the next time the TV "on" detector 763 will again determine whether the TV 14 is ON. The TV is considered ON, if video is being displayed on the television monitor. This is detected by TV ON detector 763, which can detect that the TV is ON through the magnetic fields generated by the control of the beam writing the video onto the monitor or by other techniques, such as signals sent from the television 14 to the VCR 740 indicating that the television 14 is ON. Since the guide is transmitted often and is updated as required, it is likely that the controller 750 will eventually detect a period of time in which the television guide is transmitted and in which the television 14 is OFF.

Once the conditions of the television being OFF and the proper time for receiving a television guide are satisfied, then the next step is for the controller 750 to detect a television signal source and a channel in which the television guide is being transmitted. According to a preferred embodiment, the controller 750 searches for a television signal source and a channel having the television guide. Once the search has been performed and a television signal source and a channel have been found with the television guide and guide data, then the television signal source and the channel can be stored in memory 752. The search for guide data can be performed continuously, or only if the TV 14 is OFF, or only during stored time periods. In the latter embodiment, the stored time periods are compared in controller 750 with time read from clock 754. When the times compare and the signal from TV ON detector 763 indicates that the television 14 is OFF, then controller 750 can begin a search for a television signal source and a channel having television guide and guide information.

For example, suppose that the tuner switch 701 is switched so that the television signal source is the output of cable box 730. The television signal from the cable box is sent to VCR 740 and any guide information is decoded by VBI decoder/slicer 746 or audio decoder 748 depending on the format for transmitting the guide information as indicated above in the discussion of FIGS. 2 and 3. By identifying the identifying markers for the guide information, the VBI decoder/slicer 746 determines whether guide information is contained in the received television signal. If no guide information is contained in the television signal, then the controller 750 commands the cable box 730 to tune to another channel and the controller again determines whether guide information is contained in the new channel. Once a channel received via cable is found that contains guide information then the guide information can be decoded and stored in memory 752. The guide information can then be recalled later from memory 752 and displayed on television 14 via the on-screen display controller 756. Any video clips recorded while the guide information was received can also be displayed on television 14. Display signal switch 863 is controlled by controller 750 and switches between the tuner switch 701 output A and the recorder 742 output for selecting a video signal source for TV 14. The adder/switch 764 is used to insert data from the on-screen display controller 756 into the video signal sent to the television 14.

If no guide information is contained in the television signal received from the cable box, then the controller 750 sends a command to tuner switch 701 to switch to another television signal source. For example, the tuner switch 701 can be switched to antenna 702. When the television signal from antenna 702 is switched to the switch output 728, then again the controller 750 searches through channels received via antenna 702 to find a channel that contains guide information. If guide data is found, it is then stored in memory 752 and can be displayed on television 14. The tuner 703 is used to tune to the various channels received via antenna 702. If guide information is not found in the television signal received via antenna 702, then the controller 750 controls the tuner switch 701 to select the output of satellite receiver 733. The controller 750 along with VBI decoder/slicer 746 or audio decoder 748 determines whether guide information is received from the satellite receiver 733. The controller 750 can send commands via IR transmitter 762 to IR receiver 735 to command the satellite receiver to various channels in order to search the various channels for guide information.

Figure 5B:
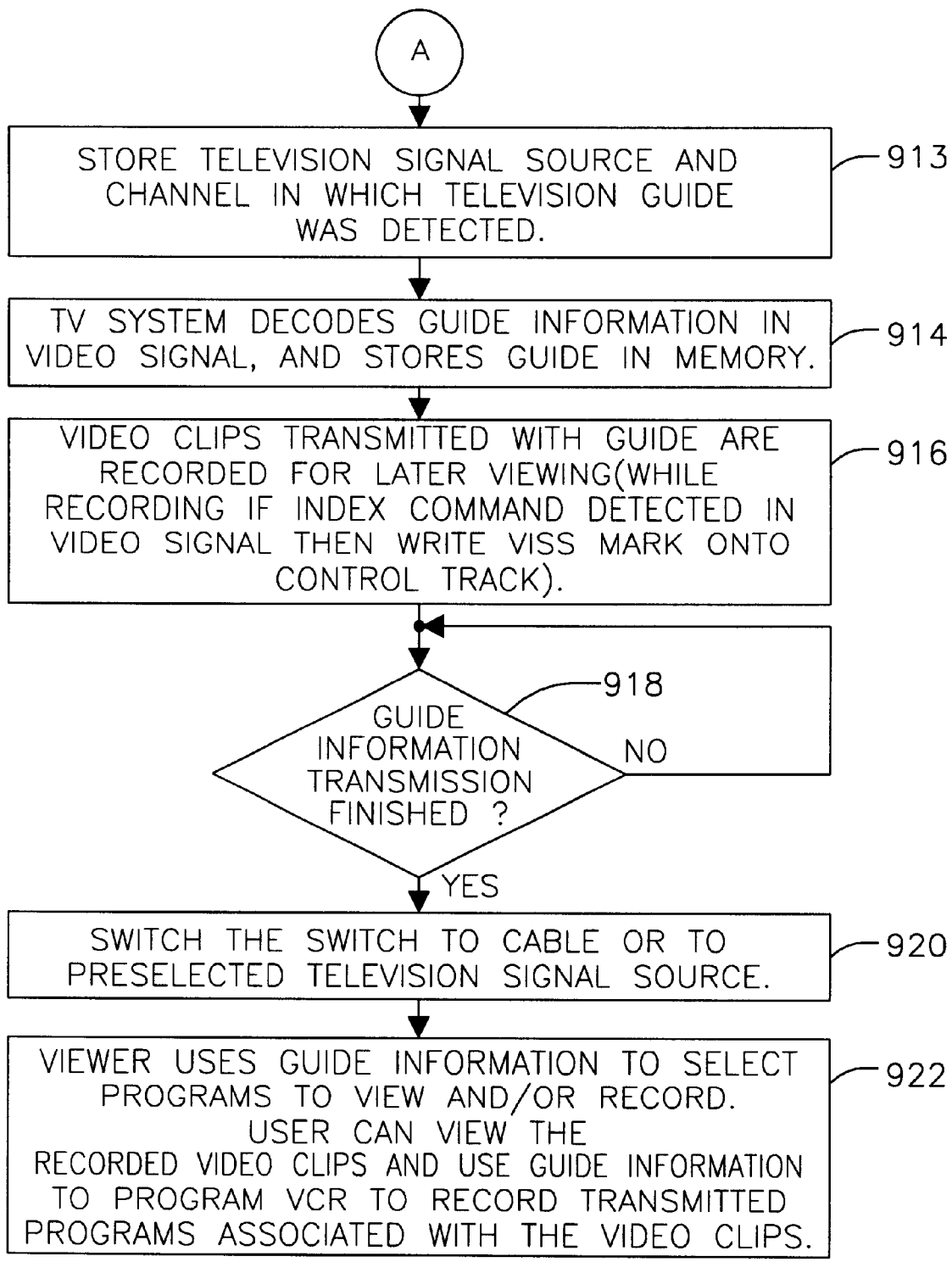

FIGS. 5A and 5B are flow diagrams of a method for accessing a television guide from a television signal. In step 900 the VCR programmed with a television signal source, a channel and times for accessing a television guide from a television signal or the VCR is programmed with only times for accessing a television guide from a television signal. In step 902 a detector detects whether or not a television monitor is ON or OFF, which indicates whether the TV is being viewed. If in step 904 it is determined that the TV monitor is OFF then in step 906 it is determined whether it is time for accessing a guide from a television signal. If the television monitor is not OFF or if it is not time for accessing a guide, then steps 902 through 906 are repeated until the television monitor is OFF and a time for accessing the guide has arrived. In an alternate embodiment steps 902 and 904 are bypassed and not performed as indicated by lines 901 and 903. In step 908 the guide and guide data are transmitted over the air, via cable, or via satellite and are embedded in the video signal. The guide and guide data can be embedded in the vertical blanking interval or the audio portion of the video signal. In step 910 video clips can also be simultaneously sent with the guide and guide data. The video clips can be previews of selected programs or can contain advertising. Then in step 911 if the television signal source and channel for accessing the guide have been programmed or stored in the VCR then the switch is switched to the specified television signal source and the channel is tuned to. Then in step 914 the VCR decodes the guide and guide data in the video signal and stores the guide and guide data in memory. The television signal source that is programmed or stored in the VCR can be either the cable box, the cable, the over the air antenna or the satellite receiver.

If no television signal source or channel have been programmed or stored in the VCR, then in step 912 the VCR searches all channels received via cable for guide and guide data in a video signal. If no guide is found then the VCR switches the switch to the antenna input and searches all channels received via antenna for the guide and guide data in the video signal. Again if no guide or guide data are found then the VCR switches the switch to the satellite receiver input and searches all channels received via satellite for the guide and the guide data in the video signal. Once a television signal source and a channel have been found with guide information then in step 913 the television signal source and the channel are stored in the memory 752 of the VCR. Then the next time that a television guide is accessed the stored television signal source and channel can be used to reduce the amount of time required to search for a television signal source and a channel containing guide information. In step 913, the time for accessing the guide can also be stored. Once guide information is detected then in step 914 the video signal is decoded to extract the guide and guide data and the guide data are stored in memory. In step 916 video clips transmitted with the guide are recorded for later viewing. While recording if index commands are detected in the video signal then VISS marks are written onto the control track of the tape. Once the transmission of the guide and guide data is finished as detected in step 918, then in step 920 the switch is switched back to the cable television signal source or to another preselected television signal source, such as the satellite receiver. Then in step 922 the viewer can use the guide and guide data to select programs to view. The viewer can also view the recorded video clips and use the guide data to program the VCR to record transmitted programs associated with the video clips.

As electronic program guides become more popular (provided either on a subscription basis, free, or supported by advertisements such as the video clips described above) viewers will find themselves with several options for on-screen guides. According to a further embodiment, the VCR scans all available television signal sources and the television signals contained therein, or any designated portion thereof, for all guide information being transmitted by those signal sources.

Preferably, each guide supplier includes a guide identifier in the VBI of the signal in which guide information is embedded at regular intervals. As the VBI decoder/slicer decodes this information, the controller stores it in the memory 752. After searching is complete, the controller 750 compiles all received guide identifiers and displays them in a list for the viewer to select. When the viewer selects a guide, the controller stores the appropriate reception instructions, e.g., start time, end time, channel, and signal source, in memory 752 for future reception of the selected guide. Preferably, a limited portion of each received guide is stored in memory 752, which can then be formatted into an abbreviated guide for the viewer to sample and make a more informed choice as to which guide should be received on a regular basis.

Another embodiment of the invention allows the viewer to tune and display channels from one television signal source while the VCR 740 scans the other television signal sources for guide information. According to this embodiment, the controller switches the output of a viewer selected signal source, e.g., the cable box 730, to tuner switch output B for direct routing to the television 14. The controller then switches between the outputs of the remaining television signal sources, i.e., antenna 782 and satellite receiver 735 at tuner switch output A. The controller scans through the signals of one signal source output from tuner switch output A and then switches to the other signal source, scanning through the signals of that source also.

The controller 750 determines the viewer selected signal source either by determining the signal source currently being viewed by the viewer on television 14 or by prompting the viewer via an on-screen display to select a signal source for viewing while the other sources are searched for guide information.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for acquiring data related to television programming comprising the steps of:

receiving from a first television signal source a television signal capable of incorporating embedded data relating to television programming;

determining if data related to television programming is embedded in the television signal from the first source;

if data related to television programming is embedded in the television signal from the first source, storing the embedded data in an electronic memory; and if data related to television programming is not embedded in the television signal from the first source, performing the following steps:

receiving from a second signal source a television signal capable of incorporating embedded data relating to television programming;

determining if data related to television programming is embedded in the television signal from the second source; and if data related to television programming is embedded in the television signal from the second source, storing the embedded data in the electronic memory.

2. The method of claim 1, additionally comprising the following steps if data related to television programming is not embedded in the television signal from the second source:

receiving from a third television signal source a television signal capable of incorporating embedded data relating to television programming;

determining if data to television programming is embedded in the television signal from the third source; and if data related to television programming is embedded in the television signal from the second source, storing the embedded data in the electronic memory.

3. The method of claim 1, in which the first source is a cable network.

4. The method of claim 1, in which the first source is a satellite receiver.

5. The method of claim 1, in which the first source is an over the air antenna.

6. The method of claim 1, in which the data is embedded in the VBI of the television signal.

7. The method of claim 1, in which the data comprises an electronic program guide.

8. The method of claim 1, in which the data comprises video clips.

9. The method of claim 1, in which the first source comprises a plurality of channels of television programs and each channel is capable of incorporating data related to television programming in its VBI and the step of determining if data related to television programming is embedded in the television signal from the first source comprises successively scanning the channels and searching the VBI of each channel while scanning.

10. The method of claim 9, in which the second source comprises a plurality of channels of television programs and each channel is capable of incorporating data related to television programming in its VBI and the step of determining if data related to television programming is embedded in the television signal from the second source comprises successively scanning the channels and searching the VBI of each channel while scanning.

11. The method of claim 1, in which the data is acquired by an appliance having a tuner that receives the television signal, the method additionally comprising the step of sensing if the appliance is turned off, the receiving steps receiving the television signal from the first and second sources only if the appliance is turned off.

12. The method of claim 11, additionally comprising the step of storing days and times for receiving information in the appliance, the sensing step only sensing if the appliance is turned off during the stored days and times.

13. The method of claim 1, additionally comprising the step of storing days and times, the determining steps only determine if the data related to television programming is embedded in the television signal during the stored days and times.

14. The method of claim 1 further comprising the step of displaying a program from a third television signal source.

* * * * *

UNITED STATES PATENT AND TRADEMARK OFFICE
CERTIFICATE OF CORRECTION

| | |
|---|---|
| PATENT NO. | : 6,341,195 B1 |
| APPLICATION NO. | : 08/862199 |
| DATED | : January 22, 2002 |
| INVENTOR(S) | : Roy J. Mankovitz and Henry C. Yuen |

It is certified that error appears in the above-identified patent and that said Letters Patent is hereby corrected as shown below:

Title Page,
Item (63) Related U.S. Application Data, after "filed on Dec. 30, 1994, now Pat. No. 5,659,367,"
Replace "which is a continuation-in-part of application No. 08/364,708, filed on Dec. 28, 1994, now Pat. No. 5,640,484." with
-- and a continuation-in-part of application No. 08/364,708, filed on Dec. 28, 1994, now Pat. No. 5,640,484 --.

Item (56) References Cited, U.S. PATENT DOCUMENTS,
Replace "6,011,594 A * 4/2000 Takashima . . . . . . . 348/468" with
-- 6,011 594 A * 1/2000   Takashima . . . . . . . . . . . . 348/468 --.

Signed and Sealed this

Twenty-fifth Day of December, 2007

JON W. DUDAS
*Director of the United States Patent and Trademark Office*